(12) United States Patent
Gebhard et al.

(10) Patent No.: US 11,067,006 B2
(45) Date of Patent: Jul. 20, 2021

(54) GAS TURBINE ENGINE SYSTEM WITH SYNCHRONIZATION FEATURES FOR GEARBOX OPERATION

(71) Applicant: Rolls-Royce Corporation, Indianapolis, IN (US)

(72) Inventors: John R. Gebhard, Fishers, IN (US); Adam L. Kempers, Indianapolis, IN (US); Andrew D. Copeland, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 119 days.

(21) Appl. No.: 16/293,030

(22) Filed: Mar. 5, 2019

(65) Prior Publication Data

US 2020/0284201 A1    Sep. 10, 2020

(51) Int. Cl.
*F02C 7/36* (2006.01)
*F02C 7/268* (2006.01)
*F02C 3/10* (2006.01)
*F02K 3/06* (2006.01)

(52) U.S. Cl.
CPC ............. *F02C 7/36* (2013.01); *F02C 3/10* (2013.01); *F02C 7/268* (2013.01); *F02K 3/06* (2013.01)

(58) Field of Classification Search
CPC .... F02C 7/32; F02C 7/36; F02C 7/268; F02C 3/10; F16D 17/00; F02K 3/06; F05D 2260/4023; F05D 2220/32; F01D 15/10; F01D 15/12; F01D 21/14; F01D 25/20
See application file for complete search history.

(56) References Cited

U.S. PATENT DOCUMENTS

| | | |
|---|---|---|
| 7,185,496 B2 | 3/2007 | Herlihy |
| 7,791,235 B2 | 9/2010 | Kern et al. |
| 8,220,245 B1 | 7/2012 | Papandreas |
| 8,230,974 B2 | 7/2012 | Parnin |
| 8,881,534 B2 | 11/2014 | Copeland et al. |
| 10,316,855 B2 * | 6/2019 | Mastro .................. F04D 19/002 |
| 2008/0072568 A1 * | 3/2008 | Moniz ....................... F02C 7/32 60/226.1 |
| 2016/0003143 A1 * | 1/2016 | Sheridan ................. F02C 3/107 415/1 |
| 2016/0097328 A1 | 4/2016 | Wintgens et al. |
| 2018/0023481 A1 | 1/2018 | Lefebvre |
| 2018/0202310 A1 * | 7/2018 | Suciu ...................... F02C 7/268 |
| 2018/0223740 A1 * | 8/2018 | Forest ....................... F02C 7/32 |

* cited by examiner

*Primary Examiner* — Justin D Seabe
*Assistant Examiner* — Ryan C Clark
(74) *Attorney, Agent, or Firm* — Barnes & Thornburg LLP

(57) ABSTRACT

A gas turbine engine includes a first spool and a second spool. The first spool includes a compressor stage, a first turbine stage, and a first shaft configured to transmit rotational energy between the first turbine stage and the compressor stage. The second spool includes a fan, a second turbine stage, and a second shaft configured to transmit rotational energy between the second turbine stage and the fan.

20 Claims, 4 Drawing Sheets

GAS TURBINE ENGINE SYSTEM WITH SYNCHRONIZATION FEATURES FOR GEARBOX OPERATION

FIELD OF THE DISCLOSURE

The present disclosure relates generally to gas turbine engines, and more specifically to rotating spools of gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines may use lubricant in areas with rotating components to cool the components and reduce friction produced during the operation of the gas turbine engine. The lubricant may collect in one or more sumps and can be recirculated back to the areas of the gas turbine engine using oil pumps.

SUMMARY

The present disclosure may comprise one or more of the following features and combinations thereof.

A gas turbine engine may include a high-pressure spool, a low-pressure spool, an accessory system, and an overrunning clutch. The high-pressure spool may include a compressor, a high-pressure turbine, and a high-pressure spool shaft. The high-pressure spool shaft may be rotatably coupled with the compressor and the high-pressure turbine to transmit rotational energy from the high-pressure turbine to the compressor during operation of the gas turbine engine to drive the compressor to rotate about an engine axis. The low-pressure spool may include a fan, a low-pressure turbine, and a low-pressure spool shaft. The low-pressure spool shaft may be coupled with the fan and the low-pressure turbine to transmit rotational energy from the low-pressure turbine to the fan to cause the fan to rotate about the engine axis to provide thrust for the gas turbine engine during operation of the gas turbine engine. The low-pressure spool shaft may be configured to transmit rotational energy from the fan to the low-pressure turbine to cause the low-pressure turbine to rotate about the engine axis during a windmill event in which the fan is rotated about the engine axis in response to ambient air pressure acting on the fan.

The accessory system may include an oil pump configured to supply oil to the low-pressure spool. The oil pump may be driven by rotation of the high-pressure spool shaft. The overrunning clutch may be coupled with the high-pressure spool shaft and the low-pressure spool shaft to allow the high-pressure spool shaft to rotate relative to the low-pressure spool shaft about the engine axis at a greater speed than the low-pressure spool shaft during operation of the gas turbine engine such that the oil pump is driven during operation of the gas turbine engine. The overrunning clutch may be configured to rotatably couple the high-pressure spool shaft with the low-pressure spool shaft to cause the high-pressure spool shaft to rotate with the low-pressure spool shaft about the engine axis at the same speed as the low-pressure spool shaft during the windmill event so that the oil pump is driven during the windmill event.

In some embodiments, the low-pressure spool may include a gearbox arranged along the engine axis. The gearbox may be coupled with the fan and the low-pressure spool shaft to cause the fan to rotate at a different speed than the low-pressure spool shaft during rotation of the low-pressure spool.

In some embodiments, the oil pump may be configured to conduct oil to the gearbox in response to the oil pump being driven. In some embodiments, the gearbox may include a pinion gear coupled with the low-pressure spool shaft for rotation therewith and planetary gears arranged circumferentially around the pinion gear. The planetary gears may be meshed with the pinion gear. The planetary gears may rotate on plain bearings. The oil pump may be configured to conduct oil to the plain bearings.

In some embodiments, the low-pressure spool shaft may be formed to include a hole that extends radially through the low-pressure spool shaft. The overrunning clutch may be aligned axially with the hole to allow oil located in the low-pressure spool shaft to flow through the hole radially outward toward the overrunning clutch during rotation of the low-pressure spool shaft. In some embodiments, the overrunning clutch may be located axially between the gearbox and the high-pressure spool shaft.

In some embodiments, the accessory system may include a tower arranged along a tower axis that is nonparallel with the engine axis. The tower may include an outer tower shaft and an inner tower shaft. The outer tower shaft may be coupled with the high-pressure spool shaft and configured to rotate about the tower axis. The inner tower shaft may be coupled with the low-pressure spool shaft and configured to rotate about the tower axis. The overrunning clutch may be coupled with the outer tower shaft and the inner tower shaft and configured to rotate about the tower axis.

In some embodiments, the overrunning clutch may be a passive clutch. The overrunning clutch may uncouple the high-pressure spool shaft from the low-pressure spool shaft automatically in response to the high-pressure spool shaft rotating faster than the low-pressure spool shaft.

In some embodiments, the accessory system may include a tower arranged along a tower axis that is nonparallel with the engine axis. The tower may include an outer tower shaft coupled with the high-pressure spool shaft and configured to rotate about the tower axis and an inner tower shaft coupled with the low-pressure spool shaft and configured to rotate about the tower axis. The overrunning clutch may be coupled with the outer tower shaft and the inner tower shaft and configured to rotate about the tower axis.

According to another aspect of the present disclosure, a gas turbine engine may include a first spool, a second spool, and an overrunning clutch. The first spool may include a compressor stage, a first turbine stage, and a first shaft. The first shaft may be configured to transmit rotational energy between the first turbine stage and the compressor stage. The second spool may include a fan, a second turbine stage, and a second shaft. The second shaft may be configured to transmit rotational energy between the second turbine stage and the fan. The overrunning clutch may be configured to couple the second shaft with the first shaft to allow the second shaft to drive rotation of the first shaft and configured to uncouple the first shaft from the second shaft to allow the first shaft to rotate relative to the second shaft.

In some embodiments, the second spool may include a gearbox coupled between the fan and the second shaft. In some embodiments, the gas turbine engine may include an oil pump that is driven by rotation of the first shaft.

In some embodiments, the second spool may include a gearbox coupled between the fan and the second shaft. The oil pump may be configured to conduct oil to the gearbox.

In some embodiments, the second shaft may be formed to include a hole that extends radially through the second shaft. The overrunning clutch may be arranged around the second shaft and aligned axially with the hole.

In some embodiments, the overrunning clutch may be passive such that the overrunning clutch uncouples the first shaft from the second shaft automatically in response to the first shaft rotating faster than the second shaft. In some embodiments, the overrunning clutch, the first shaft, and the second shaft may be configured to rotate about a single axis.

In some embodiments, the first shaft and the second shaft may be configured to rotate about a first axis. The overrunning clutch may be configured to rotate about a second axis that in nonparallel with the first axis.

According to another aspect of the present disclosure, a method may include a number of steps. The method may include providing a gas turbine engine having a first spool and a second spool, the first spool having a compressor stage, a first turbine stage, and a first shaft configured to transmit rotational energy between the first turbine stage and the compressor stage, and the second spool having a fan, a second turbine stage, and a second shaft configured to transmit rotational energy between the second turbine stage and the fan, coupling the first shaft with the second shaft to cause the first shaft to rotate with the second shaft about an axis at a same speed, and uncoupling the first shaft from the second shaft to allow the first shaft to rotate relative to the second shaft about the axis at a faster rotational speed than the second shaft.

In some embodiments, the uncoupling step may occur automatically in response to the first shaft being rotated faster than the second shaft. The coupling step may occur automatically in response to the first shaft not being rotated faster than the second shaft. In some embodiments, the gas turbine engine may include an overrunning clutch coupled to the first shaft and to the second shaft.

These and other features of the present disclosure will become more apparent from the following description of the illustrative embodiments.

DETAILED DESCRIPTION OF THE DRAWINGS

Figure 1:
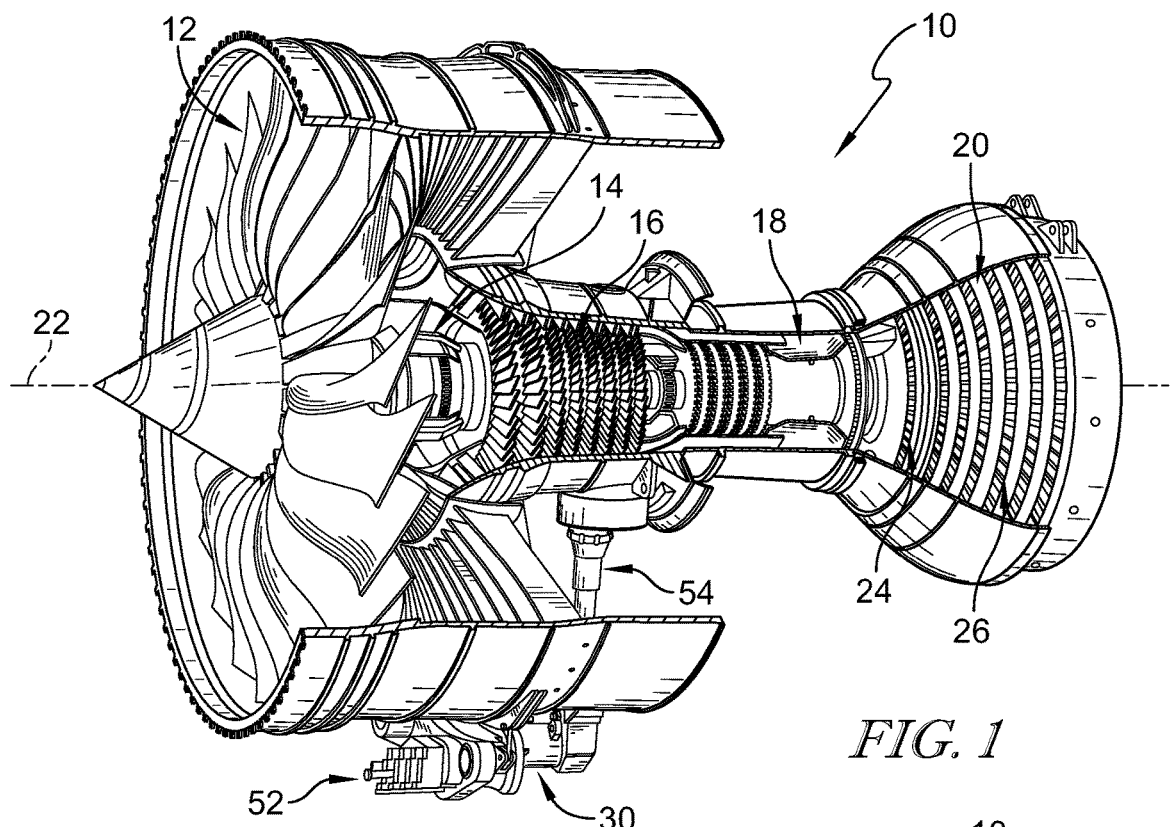
FIG. 1 is a perspective view of a gas turbine engine in accordance with the present disclosure, the gas turbine engine includes a fan for providing thrust for the engine, a compressor, a combustor, and a turbine configured to drive rotation of the fan and the compressor during operation of the gas turbine engine and further including a gearbox coupled between the fan and a stage of the turbine.

For the purposes of promoting an understanding of the principles of the disclosure, reference will now be made to a number of illustrative embodiments illustrated in the drawings and specific language will be used to describe the same.

An illustrative gas turbine engine 10 according to the present disclosure includes a fan 12, a gearbox 14, a compressor 16, a combustor 18, and a turbine 20 as shown in FIG. 1. The compressor 16 compresses and delivers pressurized air to the combustor 18. The combustor 18 mixes fuel with the compressed air received from the compressor 16 and ignites the fuel. The hot, high-pressure products of the combustion reaction in the combustor 18 are directed into the turbine 20 to cause the turbine 20 to rotate about an engine axis 22 and drive the compressor 16 and the fan 12. The gearbox 14 provides a geared reduction between the fan 12 and a low-pressure turbine stage 26 of the turbine 20. In other embodiments, the fan 12 is omitted and the turbine 20 powers a propeller or a drive shaft for rotating a thrust device or for providing rotational energy in an industrial setting.

Figure 2:
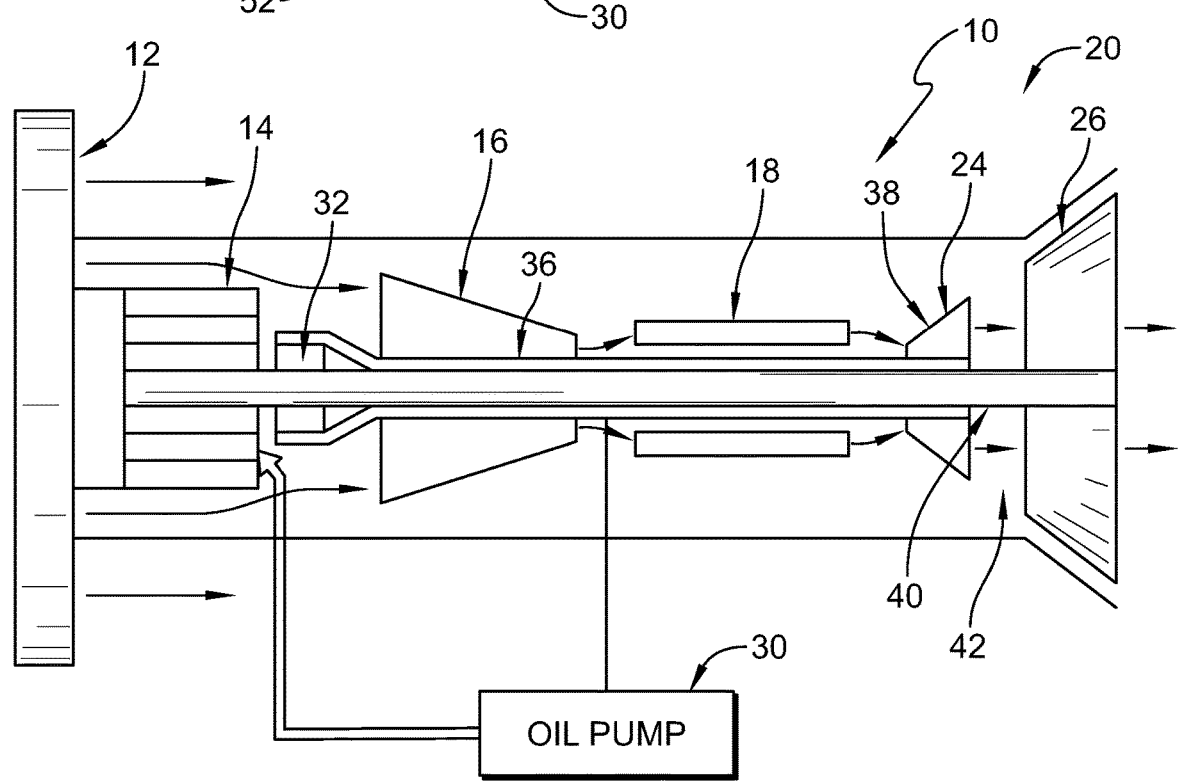
FIG. 2 is a diagrammatic view of the gas turbine engine of FIG. 1 showing that the gas turbine engine includes a high-pressure spool that comprises the compressor, a high-pressure shaft, and a high-pressure stage of the turbine, a low-pressure spool that comprises the fan, a low-pressure shaft, and a low-pressure stage of the turbine, and an overrunning clutch configured to couple the high-pressure spool with the low-pressure spool to cause the high-pressure spool to rotate with the low-pressure spool shaft during a windmill event so accessory systems such as the oil pump operate during the windmill event.

Illustratively, the turbine 20 includes a high-pressure turbine stage 24 (sometimes called a high pressure turbine) and the low-pressure turbine stage 26 (sometimes called a low pressure turbine) as shown in FIGS. 1 and 2. The high-pressure turbine stage 24 is configured to rotate about the engine axis 22 and drive the compressor 16. The compressor 16 may include a plurality of stages. The low-pressure turbine stage 26 is located downstream of the high-pressure turbine stage 24 and configured to rotate about the engine axis 22 to drive the fan 12 through the gearbox 14. The gas turbine engine 10 may include an intermediate-pressure turbine stage. The intermediate-pressure turbine stage may be coupled to an intermediate pressure stage of the compressor 16. The compressor and turbine stages include a rotor and a plurality of blades coupled with the rotor.

During operation of the gas turbine engine 10, rotation of the high-pressure turbine stage 24 powers a main oil pump 30 for conducting oil to components of the gas turbine engine 10 such as, for example, shaft bearings of the compressor 16, turbine 20, and gearbox 14. When the gas turbine engine 10 is not operating, the fan 12 and other components of the gas turbine engine 10 may still rotate about the engine axis 22 due to a windmill effect in which ambient air pressure acts on the fan 12 and rotates the fan 12. As one example, if the gas turbine engine 10 is not operating during flight, high altitude air pressure and the speed of the aircraft to which the gas turbine engine 10 is coupled cause the fan 12 to rotate.

The fan 12 is rotatably coupled with the gearbox 14 and the low-pressure turbine stage 26 such that windmilling of the fan 12 causes rotation of the gearbox 14 and the low-pressure turbine stage 26. In some gas turbine engines, the high-pressure turbine stage is always disconnected from the low-pressure turbine stage such that windmilling of the fan does not cause the main oil pump to be powered. As a result, oil may not be conducted to components of the gas turbine engine during the windmill event which may cause wear and tear on the components due to lack of lubrication. Some gas turbine engines may try to address the lack of lubrication during windmill events by including an auxiliary oil system that operates independently of the main oil pump. Such auxiliary oil systems may add complexity, weight, and costs to the gas turbine engine.

The gas turbine engine 10 of the present disclosure enables the main oil pump 30 to operate even in windmill conditions so that oil is supplied to components of the gas turbine engine 10 such as, for example, the gearbox 14 during the windmill conditions. As such, the gas turbine engine 10 may not include an auxiliary oil system for lubricating components during a windmill event. In the illustrative embodiment, the gas turbine engine 10 includes an overrunning clutch 32 (sometimes called an over-riding clutch) configured to couple the high-pressure turbine stage 24 with the low-pressure turbine stage 26 if the high-pressure turbine stage 24 is not rotating faster than the low-pressure turbine stage 26 so that the high-pressure turbine stage 24 rotates during windmill events to power the main oil pump 30 as suggested in FIGS. 5 and 6.

The compressor 16 is coupled with the high-pressure turbine stage 24 by a high-pressure spool shaft 36 as shown in FIG. 2. The compressor 16, the high-pressure turbine stage 24, and the high-pressure spool shaft 36 cooperate to provide a high-pressure spool 38 of the gas turbine engine 10. The high-pressure spool shaft 36 transmits rotational energy from the high-pressure turbine stage 24 to the compressor 16 during operation of the gas turbine engine 10 to drive the compressor 16 to rotate about an engine axis 22.

Figure 3:
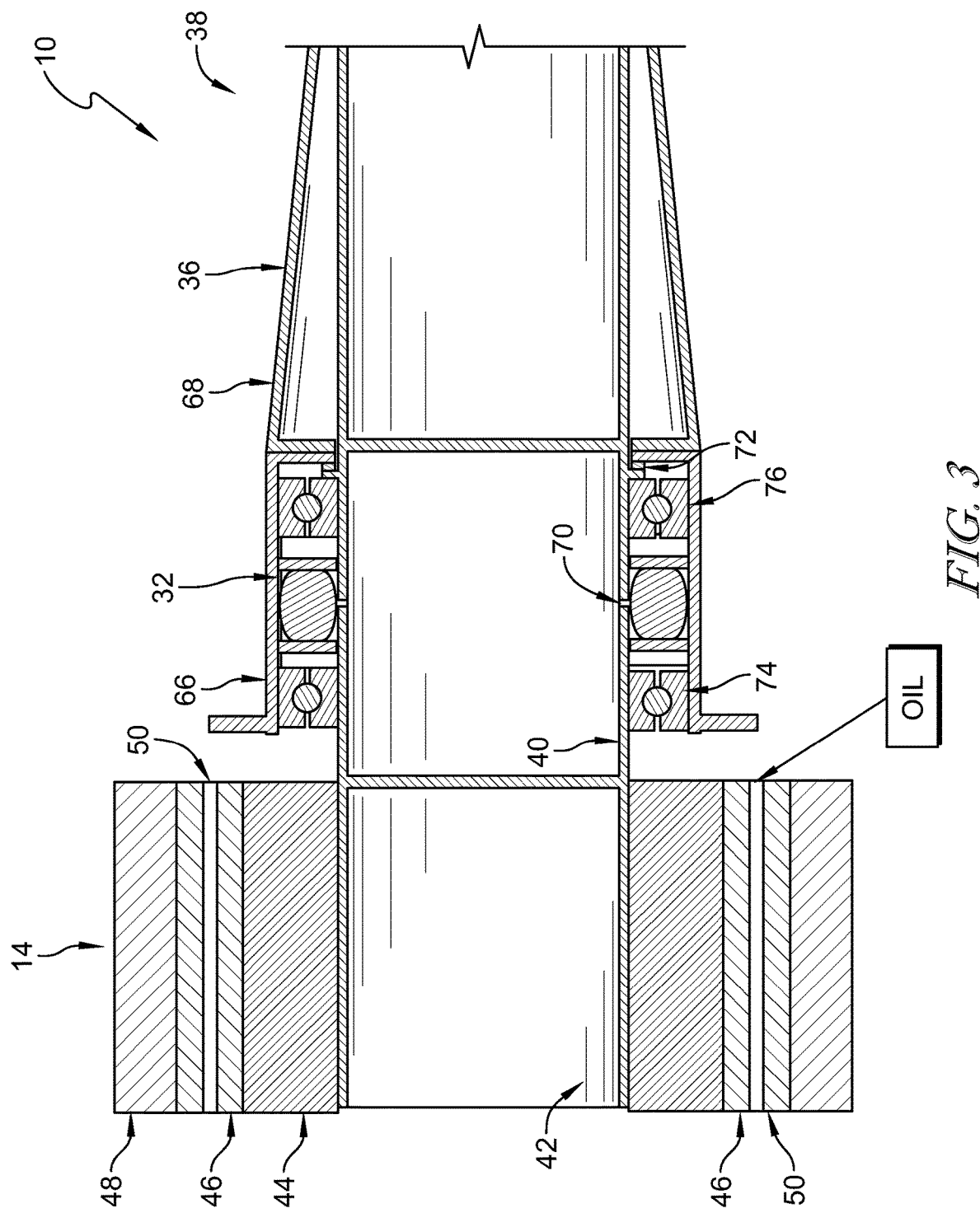
FIG. 3 is an enlarged section view of the high-pressure shaft, the low-pressure shaft, and the overrunning clutch located radially between the high-pressure shaft and the low-pressure shaft.

Illustratively, the high-pressure spool shaft 36 includes a housing 66 and a body 68 as shown in FIG. 3. The housing 66 is arranged circumferentially around the overrunning clutch 32. The housing 66 is coupled with the body 68 for rotation therewith via bolts, brazing, welding, interference fit or any other suitable alternative. In some embodiments, the housing 66 and the body 68 are a one-piece, integral component.

The fan 12 is coupled with the low-pressure turbine stage 26 by a low-pressure spool shaft 40 as shown in FIG. 2. The fan 12, the low-pressure turbine stage 26, and the low-pressure spool shaft 40 cooperate to provide a low-pressure spool 42 of the gas turbine engine 10. The low-pressure spool shaft 40 transmits rotational energy from the low-pressure turbine stage 26 to the fan 12 during operation of the gas turbine engine 10 to drive the fan 12 to rotate about an engine axis 22. The low-pressure spool shaft 40 is formed to include holes 70 that extend radially through the low-pressure spool shaft 40 to conduct oil in the low-pressure spool shaft 40 to the overrunning clutch 32. Illustratively, a seal 72 is located between the low-pressure spool shaft 40 and the high-pressure spool shaft 36 as shown in FIG. 3.

Illustratively, the low-pressure spool 42 further includes the gearbox 14 as shown in FIG. 2. The gearbox 14 is coupled with the fan 12 and with the low-pressure spool shaft 40. The gearbox 14 is driven by the low-pressure turbine stage 26 by the low-pressure spool shaft 40. The gearbox 14 allows the low-pressure turbine stage 26 to power the fan 12 while also rotating about the engine axis 22 at a different speed than the fan 12. In the illustrative embodiment, the low-pressure turbine stage 26 rotates at a greater speed than the fan 12 when the low-pressure spool 42 rotates.

The gearbox 14 (sometimes called a power gearbox) is arranged on the engine axis 22 and located axially between the fan 12 and the compressor 16. The gearbox 14 includes a pinion gear 44, planetary gears 46, and a ring gear 48 as shown in FIG. 3. The pinion gear 44 is coupled with the low-pressure spool shaft 40 for rotation therewith. The planetary gears 46 are arranged circumferentially about the pinion gear 44 and meshed with the pinion gear 44 to be rotated by the pinion gear 44. Each of the planetary gears 46 is rotatable on a plain bearing 50 (sometimes called a journal bearing). The ring gear 48 may be optional and is arranged circumferentially around and meshed with the planetary gears 46. The fan 12 is driven by one of rotation of the planetary gears 46 and the ring gear 48.

The gas turbine engine 10 further includes an accessory system 52 (sometimes called an accessory gearbox) as shown in FIG. 1. The accessory system 52 includes a tower 54, the oil pump 30, and other accessory components such as fuel pumps, filters, etc. The accessory system 52 and, thus, the oil pump 30 are driven by rotation of the high-pressure spool shaft 36. The oil pump 30 supplies oil to the low-pressure spool 42 and the high-pressure spool 38. The oil pump 30 supplies oil to the gearbox 14 and, in particular, to the plain bearings 50 included in the gearbox 14.

Figure 5:
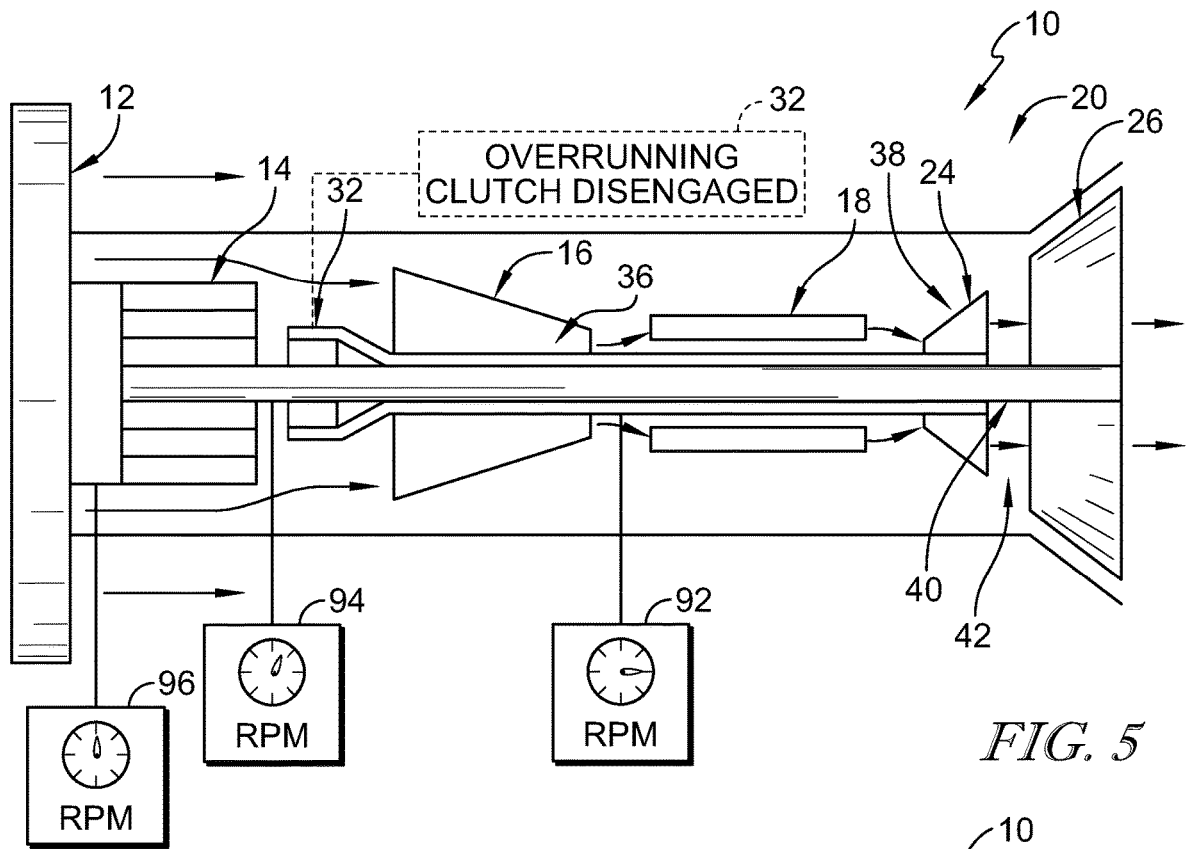
FIG. 5 is a diagrammatic view of the gas turbine engine of FIG. 1 showing the overrunning clutch is disengaged such that the high-pressure spool rotates independent of and faster than the low-pressure spool.
Figure 6:
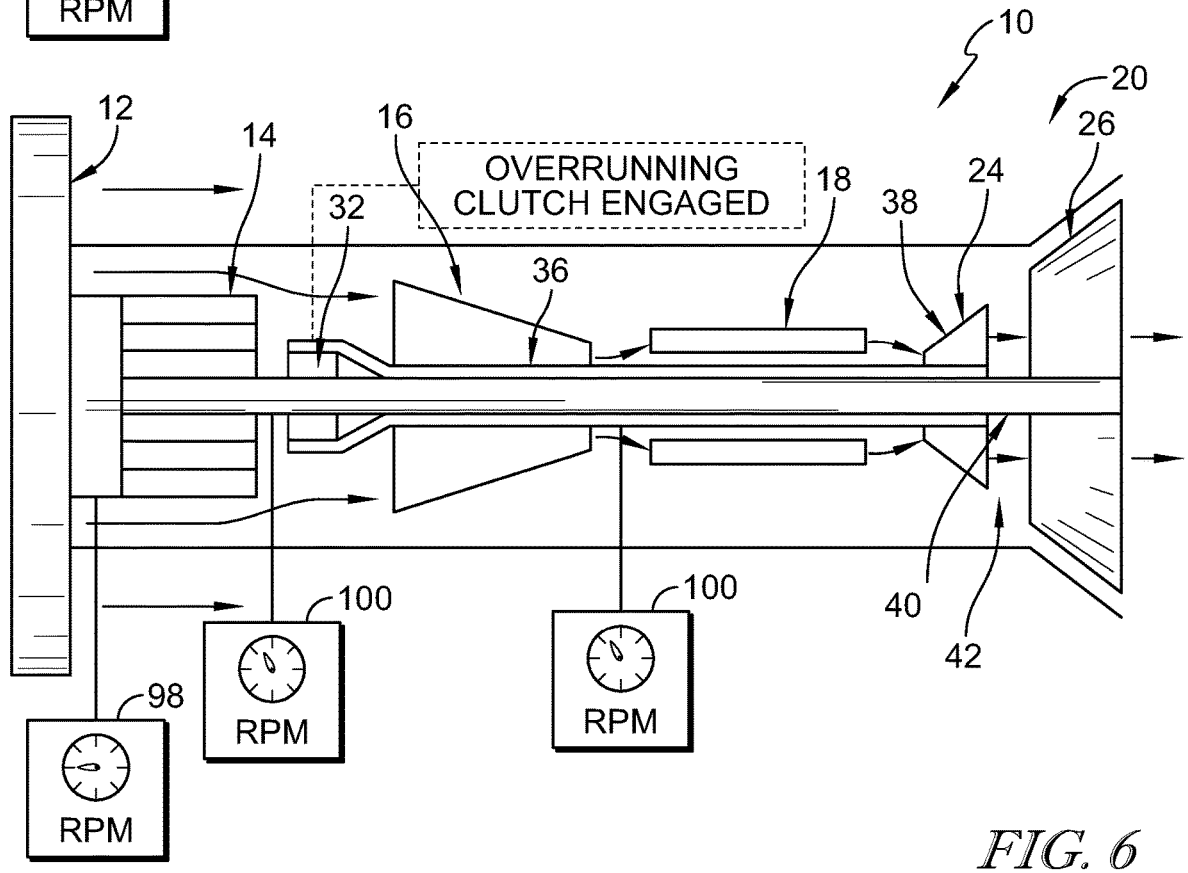
FIG. 6 is a diagrammatic view similar to FIG. 5 showing the overrunning clutch is engaged due to a windmill event such that the high-pressure spool is rotatably coupled with the low-pressure spool and rotates at the same speed as the low-pressure spool so that accessory systems like the oil pump are powered during the windmill event.

The overrunning clutch 32 is coupled with the high-pressure spool shaft 36 and the low-pressure spool shaft 40 as shown in FIGS. 2, 5, and 6. The overrunning clutch 32 allows the high-pressure spool shaft 36 to rotate relative to the low-pressure spool shaft 40 about the engine axis 22 at a greater speed than the low-pressure spool shaft 40 during operation of the gas turbine engine 10 such that the oil pump 30 is driven by the high-pressure spool shaft 36 during operation of the gas turbine engine 10. The overrunning clutch 32 rotatably couples the high-pressure spool shaft 36 with the low-pressure spool shaft 40 to cause the high-pressure spool shaft 36 to rotate with the low-pressure spool shaft 40 about the engine axis 22 at the same speed as the low-pressure spool shaft 40 when the high-pressure spool shaft 36 is not rotating faster than the low-pressure spool shaft 40 such as during a windmill event so that the oil pump 30 is driven by rotation of the high-pressure spool shaft 36 during the windmill event.

The overrunning clutch 32 may be a sprag, toothed, roller bearing, wrap spring, or wedge style overrunning clutch 32. Illustratively, the overrunning clutch 32 is a passive clutch. The passive clutch 32 uncouples the shafts 36, 40 automatically in response to the shaft 36 rotating faster than the shaft 40. In other embodiments, the overrunning clutch 32 is actively engaged and disengaged such as, for example, by a controller. As one example, the overrunning clutch 32 is disengaged in response to the gas turbine engine operating (combusting gas) in normal operation and the overrunning clutch 32 is engaged in response to the gas turbine engine 10 not combusting gas/operating. In some embodiments, the controller engages the overrunning clutch 32 in response to detecting a windmill event in which the fan 12 is rotated by air pressure.

The overrunning clutch 32 is located axially between two bearings 74, 76 as shown in FIG. 3. The bearings 74, 76 are located radially between the low-pressure spool shaft 40 and the high-pressure spool shaft 36. The bearing 74, 76 allow the high-pressure spool shaft 36 to rotate relative to the low-pressure spool shaft 40.

As suggested in FIG. 5, during normal operation of the gas turbine engine 10, the high-pressure turbine stage 24 and the low-pressure turbine stage 26 are rotated about the engine axis 22 by combusted gases from the combustor 18. The high-pressure turbine stage 24 is rotated at a greater speed than the low-pressure turbine stage 26. As a result, the high-pressure turbine stage 24 rotates the high-pressure spool shaft 36 and the compressor 16 of the high-pressure spool 38 at a first speed 92. Rotation of the high-pressure spool shaft 36 powers the accessory system 52 including the main oil pump 30. As a result, the main oil pump 30 conducts oil to the components of the gas turbine engine 10 including the plain bearings 50 of the planetary gears 46 in the gearbox 14.

The low-pressure turbine stage 26 rotates the low-pressure spool shaft 40 of the low-pressure spool 42 at a second speed 94 as suggested in FIG. 5. The first speed 92 is greater than the second speed 94 such that the overrunning clutch 32 is disengaged. The overrunning clutch 32 allows the high-pressure spool shaft 36 to rotate at the greater first speed 92 relative to the second speed 94 of the low-pressure spool shaft 40. The gearbox 14 transmits the rotational energy to the fan 12 while reducing the speed so that the fan 12 rotates at a third speed 96. The third speed is less than the second speed. The overrunning clutch 32 may engage and couple together the shafts 36, 40 during operation of the gas turbine engine such as, for example, during start up and/or during shut down.

As suggested in FIG. 6, during a windmill event, the fan 12 is rotated about the engine axis 22 at a fourth speed 98 by ambient air pressure and/or the wind. The fourth speed 98 may be a relatively low speed and is less than the third speed 96 in the illustrative embodiment. The gas turbine engine 10 may not be operating during the windmill event such that the combustor 18 is not combusting gas and the turbine 20 is not being powered by combusted gas.

Rotation of the fan 12 in the windmill event causes the low-pressure spool shaft 40 and the low-pressure turbine stage 26 to rotate at a fifth speed 100 as shown in FIG. 6. The fifth speed 100 is greater than the fourth speed 98. Rotation of the low-pressure spool 42 causes rotation of the planetary gears 46 on the plain bearings 50 in the gearbox 14 and rotation of other components of the gas turbine engine 10.

The overrunning clutch 32 engages to rotatably couple the high-pressure spool shaft 36 with the low-pressure spool shaft 40 because the high-pressure spool shaft 36 is not being driven by the high-pressure turbine stage 24 to rotate at a high speed as shown in FIG. 6. As a result, the high-pressure spool shaft 36 and the high-pressure spool 38 rotate at the fifth speed 100. Rotation of the high-pressure spool shaft 36 powers the accessory system 52 including the main oil pump 30. As a result, the main oil pump 30 conducts oil to the components of the gas turbine engine 10 including the plain bearings 50 of the planetary gears 46 in the gearbox 14 during the windmill event.

Figure 4:
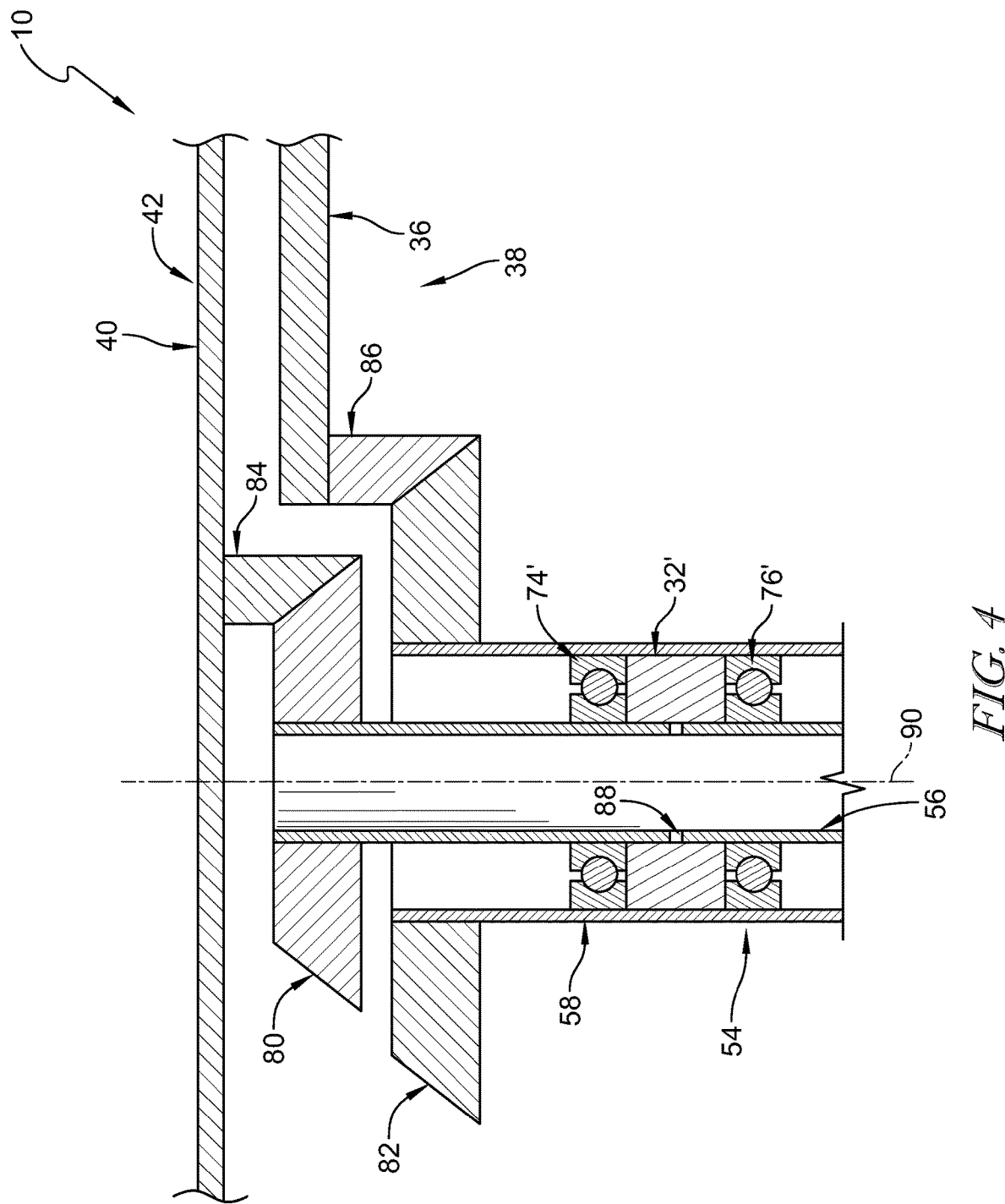
FIG. 4 is a section view of a tower included in the gas turbine engine of FIG. 1 showing that the overrunning clutch is located in the tower in some embodiments and the tower includes bevel gears meshed with bevel gears coupled with the low-pressure shaft and the high-pressure shaft.

Another embodiment of the gas turbine engine 10 is shown in FIG. 4. In such embodiments, the tower 54 includes an inner tower shaft 56, an outer tower shaft 58, a bevel gear 80 coupled with the inner tower shaft 56, and a bevel gear 82 coupled with the outer tower shaft 58. The inner tower shaft 56 and the outer tower shaft 58 are configured to rotate about a tower axis 90. The tower axis 90 is nonparallel with the engine axis 22. Illustratively, the tower axis 90 is generally perpendicular with and intersects the engine axis 22. Holes 88 extend radially through the inner tower shaft 56 relative to the tower axis 90 to conduct oil to the overrunning clutch 32'.

A bevel gear 84 is coupled with the low-pressure spool shaft 40 and meshed with the bevel gear 80 to rotatably couple the inner tower shaft 56 with the low-pressure spool shaft 40 as shown in FIG. 4. A bevel gear 86 is coupled with the high-pressure spool shaft 36 and meshed with the bevel gear 82 to rotatably couple the outer tower shaft 58 with the high-pressure spool shaft 36.

The overrunning clutch 32' is located in the tower 54 between the inner tower shaft 56 and the outer tower shaft 58 instead of along the engine axis 22 as shown in FIG. 4. The overrunning clutch 32' allows the high-pressure spool shaft 36 and the outer tower shaft 58 to rotate relative to and at a greater speed than the low-pressure spool shaft 40 and the inner tower shaft 56. The overrunning clutch 32' couples the high-pressure spool shaft 36 and the outer tower shaft 58 with the low-pressure spool shaft 40 and the inner tower shaft 56 to cause the high-pressure spool shaft 36 to rotate at the same speed as the low-pressure spool shaft 40 when the high-pressure spool shaft 36 is not rotating faster than the low-pressure spool shaft 40 (such as in a windmill event).

The present disclosure enables the main oil pump 30 to operate in normal conditions and in windmill conditions. As a result, a separate auxiliary oil system may not be used to supply oil to components (such as the gearbox 14) of the gas turbine engine 10 during the windmill conditions. The implementation of the over-riding clutch 32 may allow for a smooth transition to over-riding mode for normal operation.

Gas turbine engine architecture faces significant weight challenges and reducing the mass of the engine while sustaining the health of the power gearbox (PGB) may be desirable. When the gas turbine engine 10 shuts down there is sensitivity to the journal bearings 50 within the power gearbox 14 being supplied with enough oil to avoid any premature degradation. The present disclosure joins the shaft speed of the high-pressure spool 38 with the low-pressure spool 42 (windmilling engine driven) such that the main oil pump 30 continues to rotate and provide oil flow to the gearbox 14. The main oil pump 30 is driven off of the accessory gearbox which is high-pressure spool shaft 36 driven.

The method by which the shafts 36, 40 are synchronized at their windmill speed is via a sprag clutch 32 or some other style over-riding passive clutching mechanism 32. The design of the system spools the low-pressure spool shaft 40 and the high-pressure spool shaft 36 at the same speed as the low-pressure spool shaft 40 until the high-pressure spool shaft 36 spins faster than the low-pressure spool shaft 40 and then the over-riding clutch 32 disengages its teeth from the low-pressure spool shaft 40 allowing the two spools 38, 42 to spin independently of each other.

The description of the system function may begin with the main pinion gear 44 which is joined to the low-pressure spool shaft 40/low-pressure spool 42 and the two rotate at the same speed and in turn drive a set of planetary gears 46 which drive the fan 12. The over-riding clutch 32 is illustratively placed in the aft section of the power gearbox 14 and is mounted via an extension shaft from the high-pressure spool shaft 36/high-pressure spool 38. This then in turn is joined to the high-pressure spool shaft 36.

To preserve the health of the over-riding clutch 32, the unit may be fed with oil. The oiling of the over-riding clutch 32 is accomplished in the illustrative embodiment via holes 70 that extend radially through the low-pressure spool shaft 40. The overrunning clutch 32 is aligned axially with the holes 70 to allow the oil to move radially outward toward the overrunning clutch 32 during rotation of the low-pressure spool shaft 40.

The over-riding clutch 32 is located between two bearings 74, 76 to allow the high-pressure spool shaft 36 and the low-pressure spool shaft 40 to rotate concentrically. To seal the oil and prevent leakage between the high-pressure spool shaft 36 and the low-pressure spool shaft 40, there is a seal 72 situated adjacent the over-riding clutch 32. The two components 66, 68 of the high-pressure spool shaft 36 may be bolted together, welded, threaded, or interference fit together. Alternate layouts of the oil feed system to the over-riding clutch 32 can be accomplished, for example, by providing oil flow through housing 66 or via a splash lube scheme set-up between the housing 66 and the gearbox 14.

Another layout is to embed the over-riding clutch 32' into the towershaft assembly 54 such that the accessory gearbox 52 can continue to be relied upon to provide oil through the main oil pump 30 during windmill events. The system can be described as being the over-riding clutch 32' which engages the low-pressure spool shaft 40 once the high-pressure spool shaft 36 slows down and then subsequently engages with the low-pressure spool shaft 40.

The towershaft assembly 54 includes the inner tower shaft 56 coupled with a bevel gear 80 and the outer tower shaft 58 coupled with a bevel gear 82. The two bevel gears 80, 82 are meshed to a set of bevel gears 84, 86 on the requisite shafts 36, 40 as shown in FIG. 4. The two bearings 74', 76' can be situated between the two tower shafts 56, 58 such that the over-riding clutch 32' is located radially. When the high-pressure spool shaft 36 begins to slow down to a speed that no longer supports the rotation of the tower shaft 58. The over-riding clutch 32' then engages and subsequently rotates when the engine is windmilling through the low-pressure spool shaft 40 via a gear 84.

In some embodiments, the overrunning clutch 32 is arranged along the engine axis 22 and includes an outer race coupled with the high-pressure spool shaft 36 and configured to rotate about the engine axis 22 and an inner race coupled with the low-pressure spool shaft 40 and configured to rotate about the engine axis 22. In some embodiments, the overrunning clutch 32' is arranged along the tower axis 90 and includes an outer race coupled with the outer tower shaft and configured to rotate about the tower axis 90 and an inner race coupled with the inner tower shaft and configured to rotate about the tower axis 90.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
a high-pressure spool that includes a compressor, a high-pressure turbine, and a high-pressure spool shaft rotatably coupled with the compressor and the high-pressure turbine to transmit rotational energy from the high-pressure turbine to the compressor during operation of the gas turbine engine to drive the compressor to rotate about an engine axis,
a low-pressure spool that includes a fan, a low-pressure turbine, and a low-pressure spool shaft coupled with the fan and the low-pressure turbine to transmit rotational energy from the low-pressure turbine to the fan to cause the fan to rotate about the engine axis to provide thrust for the gas turbine engine during operation of the gas turbine engine and to transmit rotational energy from the fan to the low-pressure turbine to cause the low-pressure turbine to rotate about the engine axis during a windmill event in which the fan is rotated about the engine axis in response to ambient air pressure acting on the fan,
an accessory system that includes an oil pump configured to supply oil to the low-pressure spool and the oil pump being driven by rotation of the high-pressure spool shaft, and
an overrunning clutch coupled with the high-pressure spool shaft and the low-pressure spool shaft to allow the high-pressure spool shaft to rotate relative to the low-pressure spool shaft about the engine axis at a greater speed than the low-pressure spool shaft during operation of the gas turbine engine such that the oil pump is driven during operation of the gas turbine engine and to rotatably couple the high-pressure spool shaft with the low-pressure spool shaft to cause the high-pressure spool shaft to rotate with the low-pressure spool shaft about the engine axis at a same speed as the low-pressure spool shaft during the windmill event so that the oil pump is driven during the windmill event.

2. The gas turbine engine of claim 1, wherein the low-pressure spool further includes a gearbox arranged along the engine axis and the gearbox is coupled with the fan and the low-pressure spool shaft to cause the fan to rotate at a different speed than the low-pressure spool shaft during rotation of the low-pressure spool.

3. The gas turbine engine of claim 2, wherein the oil pump is configured to conduct oil to the gearbox in response to the oil pump being driven.

4. The gas turbine engine of claim 3, wherein the gearbox includes a pinion gear coupled with the low-pressure spool shaft for rotation therewith and planetary gears arranged circumferentially around the pinion gear, the planetary gears are meshed with the pinion gear, the planetary gears rotate on plain bearings, and the oil pump is configured to conduct oil to the plain bearings.

5. The gas turbine engine of claim 4, wherein the low-pressure spool shaft is formed to include a hole that extends radially through the low-pressure spool shaft and the overrunning clutch is aligned axially with the hole to allow oil located in the low-pressure spool shaft to flow through the hole radially outward toward the overrunning clutch during rotation of the low-pressure spool shaft.

6. The gas turbine engine of claim 2, wherein the overrunning clutch is located axially between the gearbox and the high-pressure spool shaft.

7. The gas turbine engine of claim 1, wherein the overrunning clutch is a passive clutch such that the overrunning clutch uncouples the high-pressure spool shaft from the low-pressure spool shaft automatically in response to the high-pressure spool shaft rotating faster than the low-pressure spool shaft.

8. A gas turbine engine comprising
a first spool that includes a compressor stage, a first turbine stage, and a first shaft configured to transmit rotational energy between the first turbine stage and the compressor stage,
a second spool that includes a fan, a second turbine stage, and a second shaft configured to transmit rotational energy between the second turbine stage and the fan, and
an overrunning clutch configured to couple the second shaft with the first shaft to allow the second shaft to drive rotation of the first shaft and configured to uncouple the first shaft from the second shaft to allow the first shaft to rotate relative to the second shaft.

9. The gas turbine engine of claim 8, wherein the second spool further includes a gearbox coupled between the fan and the second shaft.

10. The gas turbine engine of claim 8, further comprising an oil pump that is driven by rotation of the first shaft.

11. The gas turbine engine of claim 10, wherein the second spool further includes a gearbox coupled between the fan and the second shaft and the oil pump is configured to conduct oil to the gearbox.

12. The gas turbine engine of claim 8, wherein the second shaft is formed to include a hole that extends radially through the second shaft and the overrunning clutch is arranged around the second shaft and aligned axially with the hole.

13. The gas turbine engine of claim 8, wherein the overrunning clutch is a passive clutch such that the overrunning clutch uncouples the first shaft from the second shaft automatically in response to the first shaft rotating faster than the second shaft.

14. The gas turbine engine of claim 8, wherein the overrunning clutch, the first shaft, and the second shaft are configured to rotate about a single axis.

15. The gas turbine engine of claim 8, wherein the first shaft and the second shaft are configured to rotate about a first axis and the gas turbine engine further comprises a tower arranged along a second axis that is nonparallel with the first axis, the tower includes an outer tower shaft coupled via gearing with the first shaft and configured to rotate about the second axis and an inner tower shaft coupled via gearing with the second shaft and configured to rotate about the tower axis, the overrunning clutch is coupled with the outer tower shaft and the inner tower shaft and configured to couple the second shaft with the first shaft by coupling the inner tower shaft with the outer tower shaft, and the overrunning clutch is configured to rotate about the second axis that is nonparallel with the first axis.

16. A method comprising
providing a gas turbine engine having a first spool and a second spool, the first spool having a compressor stage, a first turbine stage, and a first shaft configured to transmit rotational energy between the first turbine stage and the compressor stage, and the second spool having a fan, a second turbine stage, and a second shaft configured to transmit rotational energy between the second turbine stage and the fan,
coupling the first shaft with the second shaft to cause the first shaft to rotate with the second shaft about an axis at a same speed, and
uncoupling the first shaft from the second shaft to allow the first shaft to rotate relative to the second shaft about the axis at a faster rotational speed than the second shaft.

17. The method of claim 16, wherein the uncoupling step occurs automatically in response to the first shaft being rotated faster than the second shaft and the coupling step occurs automatically in response to the first shaft not being rotated faster than the second shaft.

18. The method of claim 16, wherein the gas turbine engine includes an overrunning clutch coupled to the first shaft and to the second shaft.

19. The method of claim 16, wherein the gas turbine engine further includes a tower that includes an outer tower shaft coupled with the first shaft, an inner tower shaft coupled with the second shaft, and an overrunning clutch coupled with the outer tower shaft and the inner tower shaft and wherein the overrunning clutch is configured to couple and uncouple the inner tower shaft and the outer tower shaft to thereby couple and uncouple respectively the first shaft and the second shaft.

20. The gas turbine engine of claim 15, wherein the first spool includes a first bevel gear coupled with the first shaft, the second spool includes a second bevel gear coupled with the second shaft, the tower includes a third bevel gear coupled with the outer tower shaft and meshed with the first bevel gear, and the tower includes a fourth bevel gear coupled with the inner tower shaft and meshed with the second bevel gear.

* * * * *